United States Patent [19]

Makino et al.

[11] Patent Number: 4,878,135

[45] Date of Patent: Oct. 31, 1989

[54] METHOD AND SYSTEM FOR A MAGNETIC DISK DRIVE EMPLOYING A QUADRATIC COMPENSATION FUNCTION FOR DETERMINING AN OFFSET CORRECTION VALUE

[75] Inventors: Toshihiko Makino, Tokyo; Makoto Nagasawa, Ibaraki, both of Japan

[73] Assignee: NEC Corporation, Tokyo, Japan

[21] Appl. No.: 67,031

[22] Filed: Jun. 29, 1987

[30] Foreign Application Priority Data

Jun. 27, 1986 [JP] Japan .................................. 61-152047

[51] Int. Cl.$^4$ .......................... G11B 5/55; G11B 5/596
[52] U.S. Cl. ............................... 360/78.04; 360/77.04; 360/77.07; 360/78.11
[58] Field of Search ............................. 360/77, 78, 75; 318/634, 632, 561, 592; 364/170, 571

[56] References Cited

U.S. PATENT DOCUMENTS

| | | | |
|---|---|---|---|
| RE. 32,075 | 1/1986 | Harrison et al. | 360/77 |
| 4,122,503 | 10/1978 | Allan | 360/78 |
| 4,697,213 | 9/1987 | Kitamura | 360/78 |
| 4,731,680 | 3/1988 | Mariyana | 360/78 |

OTHER PUBLICATIONS

IBM TDB, vol. 19, No. 6, "Self-Calibrating Disk Storage Apparatus" Griffiths et al., 11/76, pp. 1991-1992.
IBM TDB, vol. 17, No. 6, "Correction of Data Track Misregistration in Servo Controlled Disk Files", Paton, 11/74, pp. 1781-1783.

*Primary Examiner*—Alan Faber
*Assistant Examiner*—Steven R. Garland
*Attorney, Agent, or Firm*—Sughrue, Mion, Zinn, Macpeak & Seas

[57] ABSTRACT

A head positioning system for use with a magnetic disk with outer, middle and inner servo tracks which are radially separated by data tracks. The head positioning system includes a measuring element for measuring deviations of the magnetic head from the outer, middle and inner servo tracks by reading the servo information recorded on each of the servo tracks and generating first, second and third deviation values. The head positioning system also includes a determining element which determines an offset correction value for a targtet data track included in the data tracks in accordance with a quadratic compensation function and the first, second and third deviation values. A fine positioning element positions the magnetic track of the target track according to the offset correction value.

37 Claims, 4 Drawing Sheets

METHOD AND SYSTEM FOR A MAGNETIC DISK DRIVE EMPLOYING A QUADRATIC COMPENSATION FUNCTION FOR DETERMINING AN OFFSET CORRECTION VALUE

BACKGROUND OF THE INVENTION

The present invention relates to a head positioning system for magnetic disk drives, which drives a magnetic head from a current track to a target in the radial direction of a magnetic disk and then positions the magnetic head on the center line of the target track.

Such a head positioning system is required to correct a magnetic head position such that the magnetic head is accurately located on the center line of the target track after a track seeking operation is completed due to dimensional deviations in the magnetic disk because of temperature and humidity changes. To this end, the conventional head positioning system utilizes servo information recorded on a part of a data surface of the magnetic disk as disclosed in U.S. Pat. No. 4,122,503. In the system, the magnetic disk includes an inner servo track $x_0$ and an outer servo track $x_1$ on which the servo information is prerecorded. The head positioning system initially positions the magnetic head at the inner and outer servo track and then reads the servo information by means of the magnetic head to obtain deviation values $y_0$ and $y_1$ of the head with respect to the inner and outer servo tracks $x_0$ and $x_1$, respectively. When the head positioning system positions the magnetic head at a target data track n which is located between the inner and outer servo tracks $x_0$ and $x_1$, an offset correction value y, which represents a deviation of the magnetic head from the center line of the target track n after the track seeking operation, is calculated as follows:

$$y = \frac{y_1 - y_0}{x_1 - x_0} n + y_0$$

That is, the correction value y is estimated in accordance with an assumption that the deviation of the magnetic head on the target track n increases or decreases in proportion to the radial position of the target track n.

However, the inventors of the present invention have found that the actual deviation of the magnetic head is not accurately represented by the above formula since the head positioning system consists of various components which have various thermal expansion coefficients. Accordingly, in the conventional head positioning system, the deviation of the magnetic head from the center line of the target track is still relatively large so that the track width of the magnetic disk is made inevitably wide enough to render negligible the deviation of the magnetic head. Thus, the high track density cannot be realized.

SUMMARY OF THE INVENTION

Accordingly, an object of the present invention is to provide a head positioning system capable of positioning a magnetic head at the center line of a target track with high accuracy.

Another object of the present invention is to provide a head positioning system in which an offset correction value for correcting a head position after a track seeking operation is determined in a novel manner to reduce the difference of the actual deviation of the magnetic head from the center line of the target track.

A head positioning system according to the present invention comprises a magnetic disk including outer, middle and inner servo tracks on which the servo information is recorded, and which are radially separated by data tracks, measuring means for measuring deviations of a magnetic head from the outer, middle and inner servo tracks by reading the servo information recorded on the outer, middle and inner servo tracks after track seeking operations to each of the respective servo tracks so as to generate first, second and third deviation values, respectively, determining means for determining an offset correction value for a target data track for correcting the magnetic head position in the radial direction of the magnetic disk after the track seeking operation to the target data track in accordance with a quadratic compensation function and the first, second and third deviation values.

DESCRIPTION OF THE PREFERRED EMBODIMENT

Figure 1:
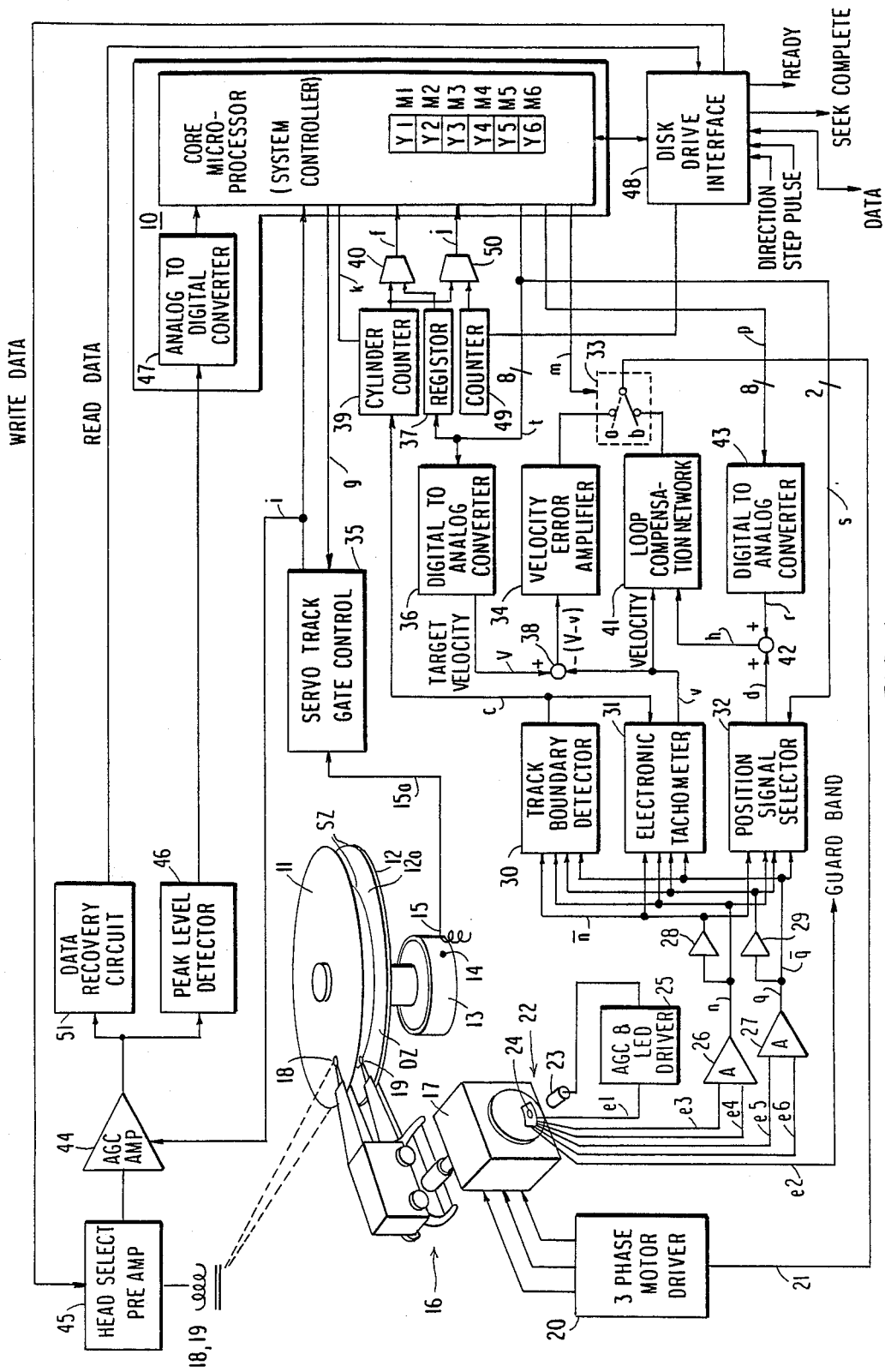
FIG. 1 is a block diagram showing a head positioning system for a magnetic disk device according to an embodiment of the present invention.

FIG. 1 shows a magnetic disk drive according to an embodiment of the present invention. The disk drive includes 5.25 or 3.5 inch diameter magnetic disks 11 and 12 which are caused to rotate about the common axis by a spindle motor 13 at a constant velocity of 3600 r.p.m. The magnetic disks 11 and 12 are formed of a thin aluminum plate having suitable magnetic coating on the surfaces thereof, which are generally called "hard disk". The spindle motor 13 is provided with an index marker 14 sensed by an index sensor 15 to generate an index pulse 15a once for every rotation of the spindle motor 13. The index pulse indicates the beginning of tracks of the magnetic disks 11 and 12.

Figure 2:
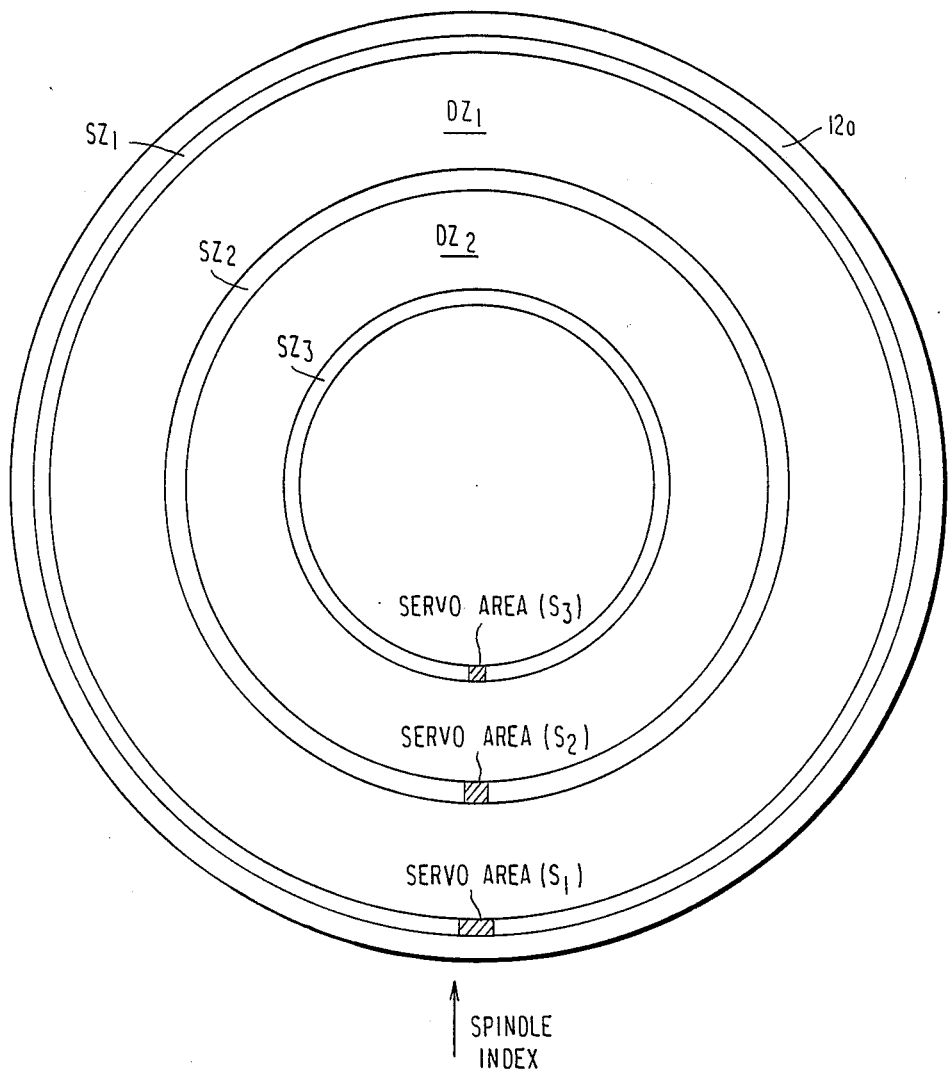
FIGS. 2 and 3 show locations of servo areas on one surface of a magnetic disk utilized in the head positioning system shown in FIG. 1.
Figure 3:
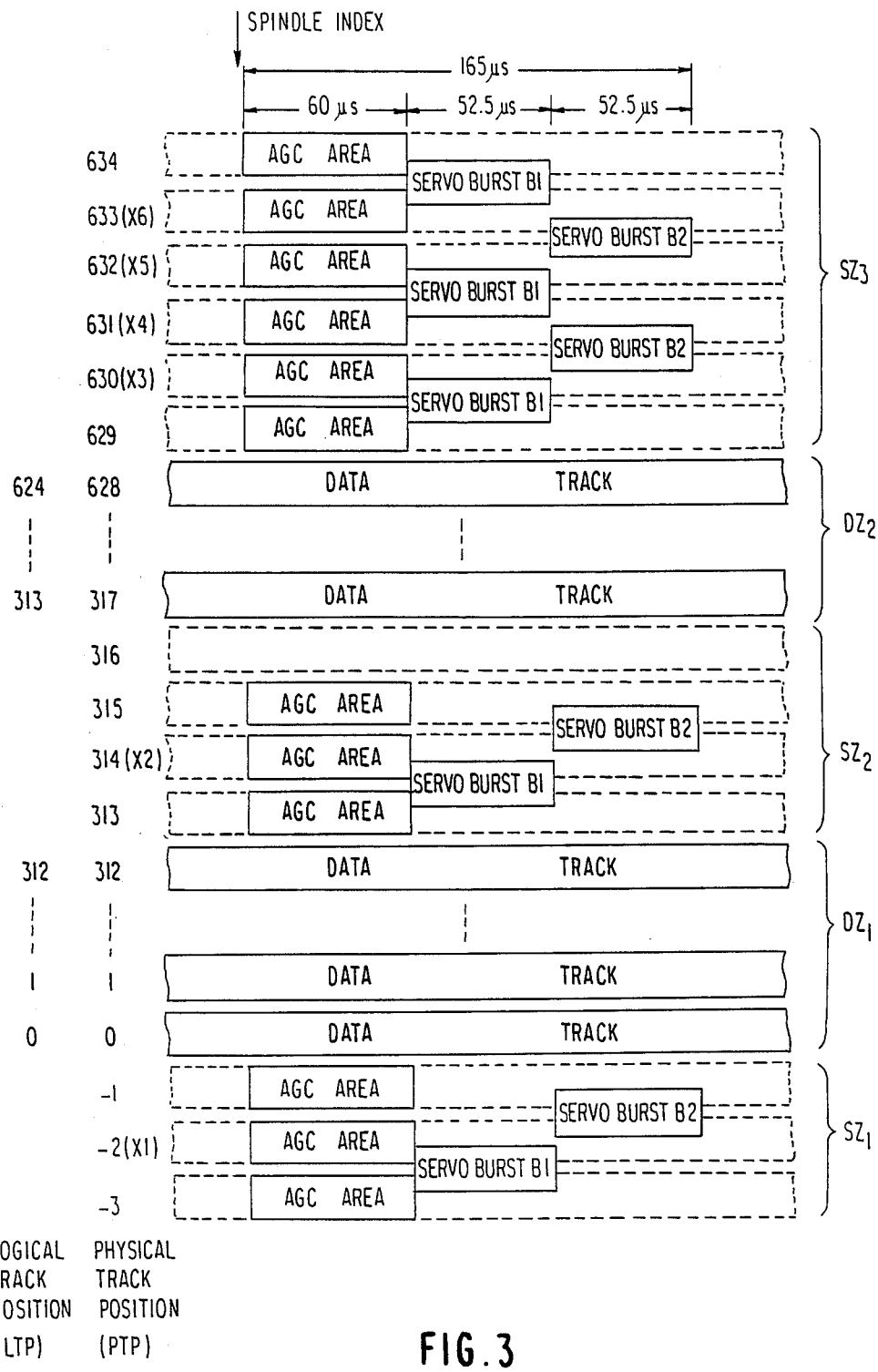

Referring also to FIGS. 2 and 3, an upper surface 12a of the disk 12 is provided with concentric data zones $DZ_1$ and $DZ_2$, an outer servo zone $SZ_1$ located outside of the data zone $DZ_1$, a middle servo zone $SZ_2$ located between the data zones $DZ_1$ and $DZ_2$, and an inner servo zone $SZ_3$ located inside of the data zone $DZ_2$. The surface 12a has a plurality of physical track positions (PTPs) $-3$ to 634, in which the servo zone $SZ_1$ is alotted in PTPs($-3$) to ($-1$), the data zone $DZ_2$ is in PTPs 0 to 312, the servo zone $SZ_2$ is in PTPs 313 to 315, the data zone $DZ_2$ is in PTPs 317 to 628 and the servo zone $SZ_3$ is in 629 to 634. Further, the data zones $DZ_1$ and $DZ_2$ have sequential logical track positions (LTPs) 0 to 624. The LTPs are utilized to indicate the data zones $DZ_1$ and $DZ_2$ by the user.

The servo zones $SZ_1$, $SZ_2$ and $SZ_3$ have servo areas $S_1$, $S_2$ and $S_3$ at their leading portions, i.e., at the portions immediately after the index pulse is generated. Servo information is factory prerecorded only in the servo areas $S_1$, $S_2$ and $S_3$. The servo areas $S_1$, $S_2$ and $S_3$ each includes automatic gain control (AGC) areas located on the servo tracks and followed by first and second servo bursts B1 and B2. The outside half of the first burst B1 is located on the odd track and the inside half thereof is on the even track. Conversely, the outside half of the second burst B2 is on the even track and the inside half thereof is on the odd track. The servo bursts B1 and B2 are used to provide a track centerline position of the respective servo track as is well known in the art. The lengthes of the AGC area, the servo bursts B1 and B2 correspond to disk rotational time periods of 60 μsec, 52.5 μsec and 52.5 μsec, respectively.

The other surfaces of the disks 11 and 12, i.e., both surfaces of the disk 11 and a lower surface of the disk 12 are provided only with respective data zones which are located on the same position as the surface 12a. No information is recorded on the portions of the other surfaces corresponding to the servo zones $SZ_1$, $SZ_2$ and $SZ_3$.

Referring back to FIG. 1, a head carriage assembly 16 includes a 3-phase torque motor 17 by which air bearing effect magnetic heads 18 and 19 are moved in the radial direction of the disks 11 and 12. The heads 18 and 19 are provided for the upper surfaces of the disks 11 and 12, respectively. Although only the upper heads 18 and 19 are illustrated, the lower heads are also provided for the lower surfaces of the disk 11 and 12. A motor driver 20 determines drive currents applied to three phases of the torque motor 17 in response to a speed or position control signal 21.

Figure 4A:
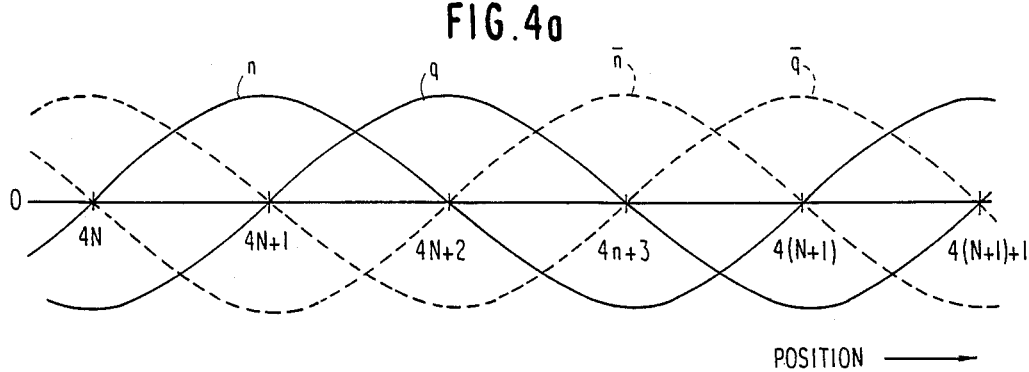
FIGS. 4(a) and 4(b) show position signals and cylinder pulses obtained by an optical encoder and a boundary detector shown in FIG. 1.

The rotational position of the motor 17 is detected by an optical encoder 22. The encoder 22 includes a light emitting diode (LED) 23, a movable scale (not shown) fixed to a rotary shaft of the motor 17 and a photo sensitive array 24 opposite to the light emitting diode 23. One output e1 of the array 24 is applied to a LED driver 25 in order to keep the intensity of the LED 23 uniform. Another output e2 represents a limit rotational position of the motor 17 where the heads 11 and 12 are positioned on about (−3) track. The output e2 is supplied to a microprocessor 10. The other four outputs e3 to e6 are applied to differential amplifiers 26 and 27 so as to generate quadrature position signals n and q, as is well known in the art. The phase of the position signal q is shifted by 90 degrees with respect to the position signal n, as shown in FIG. 4(a). The position signals n and q are inverted by inverters 28 and 29, respectively, so as to generate inverted position signals $\bar{n}$ and $\bar{q}$. A zero-cross point turning from minus value to plus value of the position signal n represents the center of the track 4N (N=−1, 0, 1, 2, . . . ) when the thermal and humidity offset is not caused in the disks 11 and 12. Similarly, zero-cross points of the position signals q, $\bar{n}$, $\bar{q}$ represents the center of the tracks 4N+1, 4N+2 and 4N+3, respectively.

Figure 4B:
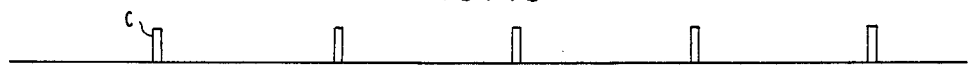

The position signals n, q, $\bar{n}$ and $\bar{q}$ are supplied to a track boundary detector 30, an electronic tachometer 31 and a position signal selector 32. The track boundary detector 30 detects the boundary of the tracks by comparing the position signals n with q and $\bar{q}$, i.e., by detecting cross-points of the position signals n, q and $\bar{q}$, so that a cylinder pulse c is generated as shown in FIG. 4(b). The electronic tachometer 31 detects the rotary speed of the motor 17 in accordance with the position signals n, q, $\bar{n}$ and $\bar{q}$ and generates a velocity signal v. The position signal selector 32 selects one of the position signals n, q, $\bar{n}$ and $\bar{q}$ in response to a lower two bit signal s of a target track signal t. The selector 32 outputs a deflection voltage d which represents an amplitude of the selected position signal.

With the power switch of the disk drive turned on, the spindle motor 13 is started to rotate and the heads 11 and 12 are brought to track 0 the same way as in a conventional disk drive. The microprocessor 10 then carries out a calibrating operation to measure the deviation values where the head 19 is positioned on servo tracks ($X_1=-2$, $X_2=314$, $X_3=630$, $X_4=631$, $X_5=632$ and $X_6=633$). The processor 10 enables a servo loop switch 33 to select a terminal a, i.e., to connect a velocity error amplifier 34 and the motor driver 20 via a velocity or position control mode signal m. Additionally, the processor 10 enables a servo track gate controller 35 which detects the servo areas $S_1$, $S_2$ and $S_3$ in response to the index pulse 15a to operate via a gate control signal g. Then, the processor 10 supplies a physical track position (PTP) of ($X_1=-2$) as a target track to a digital to analog converter 36 via the 8 bit target track signal t. The processor 10 supplies the PTP also to a registor 37 to set the value (−2).

The converter 36 converts the target track signal t into analog form as a target velocity V and supplies it to a subtractor 38. The subtracter 38 calculates the difference between the target velocity V and the motor velocity v(=0) and supplies the result to the velocity error amplifier 34. The velocity error amplifier 34 amplifies the differential value (V−v) and supplies it to the motor driver 20 via the switch 33 and the control signal line 21. The motor driver 20 determines the drive currents for the motor 17 in accordance with the signal 21.

The motor 17 is rotated by the driver 20 to move the heads 18 and 19 toward the target track (−2). In response to the rotation of the motor 17, the cylinder pulse c is supplied to a cylinder counter 39 which counts the number of the cylinder pulse c to detect the number of tracks (cylinders) which the heads 18 and 19 has moved. The contents of the cylinder counter 39 and the registor 37 are subtracted by a subtracter 40. The output f of the subtracter represents a distance between the target track and the current track on which the heads 18 and 19 are presently positioned. The output f is applied to the processor 10 to update the target track signal t. The target velocity V is thus updated by the updated target signal t. The rotational speed v of the motor 17 is detected by the electronic tachometer 31 and applied to the subtracter 38. The differential value (V−v) is gradually decreased as the heads 18 and 19 approach the target track. Accordingly, the value of the control signal 21 is also decreased.

When the count value of the cylinder counter 39 reaches to (−2), it means the heads 18 and 19 are moved outward to the disks 11 and 12 from track 0, the output f becomes "0". In this state, the heads 18 and 19 are positioned on the track boundary between the tracks (−1) and (−2), and therefore, the heads 18 and 19 should be moved outwardly more about half pitch of the track width. The processor 10 enables the servo loop switch 33 to select a terminal b via the signal line m so as to connect a loop compensation network 41 to the motor driver 20. Thus, the servo system transfers from the velocity control mode to a position control mode.

The loop compensation network 41 determines the value of the control signal 21 in accordance with a position control voltage h from a summing circuit 42 which sums the deflection voltage d of the position signal selector 32 and an offset correction value r of a digital to analog converter 43. In this calibrating operation, the offset correction value r is set to "0". The position signal selector 32 selects a position signal $\bar{n}$ since the target track is (−2) (=4N+2; N=−1). The voltage d represents the distance between the current head position and the center of the target track (−2) when there are no causes of thermal offset in the disks 11 and 12. The loop compensation network 41 determines the value of the position control signal 21 in accordance only with the voltage d and supplies to the motor driver 20. As the motor 17 moves the heads 18 and 19 outwardly and the heads 18 and 19 approach the center of the target track (−2), the voltage v is decreased until it finally becomes about "0". It should be noted that the velocity signal v of the tachometer 31 is supplied to the compensation network 41 to stabilize the closed-loop system. The processor 10 considers the head 19 to be positioned on the servo track (−2) when 5 msec has passed after the positioning control mode has started.

Then, the processor 10 measures the deviation of the magnetic head 19 with respect to the center line of the servo track (−2). A head selector and preamplifier 45 selects the head 19 which reads the AGC signal and the servo burts B1 and B2 in sequence. An automatic gain control (AGC) amplifier 44 determines its gain by means of the read-out AGC signal. In response to the index pulse 15a, the servo track gate controller 35 sends a gate signal i to the processor 10 and the AGC amplifier 44. The gate signal i disenables the AGC amplifier 44 from operating during the time period corresponding to the servo bursts B1 and B2 of the servo srea $S_1$, i.e., about 105 μsec. Accordingly, the AGC amplifier 44 holds its gain while the head 19 reads the servo bursts B1 and B2. The read-out signal is sent to a peak level detector 46, and then their peak amplitudes are detected. The peak amplitudes of the bursts B1 and B2 are sequentially provided to an analog to digital converter 47 which is included in the micro processor 10 and are converted in digital values. The processor 10 calculates the difference between the peak amplitude values of the bursts B1 and B2 and stores it in its internal memory M1 as a deviation value $Y_1$.

Next, the processor 10 moves the head 19 to the servo track ($X_2$=314) in the same manner as described above. When the head 19 is positioned on the servo track 314, the servo bursts B1 and B2 are read. The processor 10 calculates the difference between the bursts B1 and B2 and stores it in its memory M2 as a deviation value $Y_2$. Similarly, the servo bursts B1 and B2 on the servo tracks $X_3$(=630), $X_4$(=631), $X_5$(=632) and $X_6$(=633) are read and their differences are stored in memories M3, M4, M5 and M6 as deviation values $Y_3$, $Y_4$, $Y_5$ and $Y_6$. The differences between the deviation values $Y_3$ to $Y_6$ represent errors between the position signals $\bar{n}$, q, n and $\bar{q}$, i.e., the characteristics of the optical encoder 22. Then, the processor 10 moves the head 19 back to track 0. In this manner, the initial calibrating operation is completed. The processor 10 sends a "READY" signal to a host unit (not shown) via a disk drive interface 48.

The disk drive interface 48 receives a direction signal and step pulses in a target track accessing operation. The direction signal indicates a direction (inside or outside) in which the heads 18 and 19 to be moved. The number of the step pulses indicates the number of tracks for the heads to be moved and is determined in accordance with the logical track positions (LTPs) 0 to 624.

The step pulses are sent to a step counter 49 so that the number of the step pulses is counted and stored. The processor 10 enables the switch 33 to select the terminal a, i.e., performs the velocity control mode. The processor 10 also counts the number of the step pulses and converts it to the physical track position (PTP) in order to generate a target track signal t. The velocity error amplifier 34 determines the value of the velocity control signals 21 in accordance with the difference (V-v) between the target velocity V and the motor velocity v. The motor drivr 20 rotates the motor 17 in accordance with the velocity control signal 21 such that the heads 18 and 19 are moved to the target track, as described previously.

In response to the rotation of the motor 17, the cylinder pulse c is generated and the number thereof is counted by the cylinder counter 39. The contents of the counters 39 and 49 are subtracted by a subtracter 50. When the subtracted value j becomes "0", the processor 10 confirms whether or not this track seek operation has caused the heads 18 and 19 to move from one data zone (e.g. $DZ_1$) to another data zone (e.g. $DZ_2$). If the heads 18 and 19 has been moved to another data zone, the processor 10 adds the value ±4 to the cylinder counter 39 via the line k. That is, if the heads 18 and 19 has been moved from the data zone $DZ_1$ to the data zone $DZ_2$, the processor 10 adds the value "−4" to the counter 39 since the PTP is larger than LTP by 4. If the heads 18 and 19 have been moved from the data zone $DZ_2$ to the data zone $DZ_1$, the processor 10 adds the value "4" to the counter 39. Due to this operation, the motor 17 moves the heads 18 and 19 by four track pitches, again. When the output j becomes "0", again, the processor 10 enables the switch 33 to select the terminal b so that the position control mode is started. If the heads 18 and 19 have been moved within the same data zone $DZ_1$ or $DZ_2$ by the seeking operation, the processor 10 instantly carries out the position control mode when the output j becomes "0".

In the position control mode, the processor 10 calculates an offset correction value Y in accordance with the PTPs of the target track (X), the outer servo track ($X_1$), the middle servo track ($X_2$) and the inner servo track ($X_3$), and the deviation values $Y_1$, $Y_2$ and $Y_3$ stores in the memories M1, M2 and M3. The correction value Y is obtained from Lagrange's interpolation formula under the condition where the $(X_2-X_1)=(X_3-X_2)$, as follows:

$$Y = 2(Y_1 - 2Y_2 + Y_3)\frac{X^2}{(X_3 - X_1)^2} + \quad (1)$$

$$(4Y_2 - 3Y_1 - Y_3)\frac{X}{(X_3 - X_1)^2} + Y_1$$

It is apparent that the correction value Y is represented by a quadratic function with respect to "X".

Figure 5:
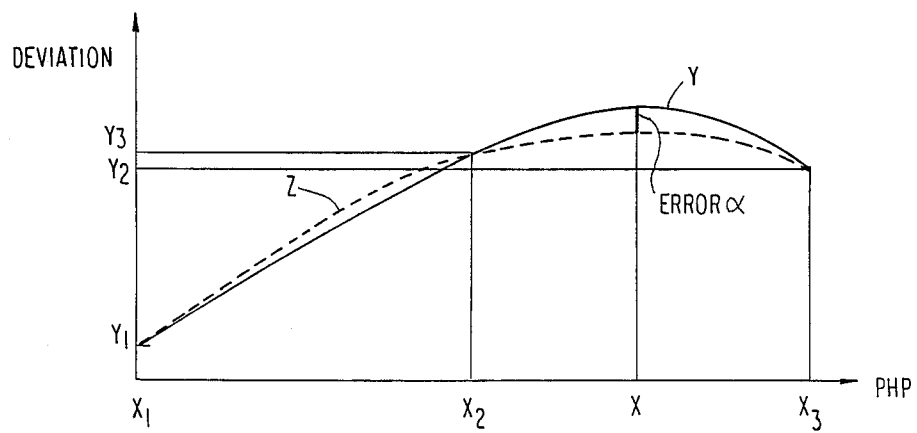
FIG. 5 shows a relationship between a correction value and an actual deviation value.

FIG. 5 shows an example of a relationship between the correction value Y obtained by formula (1) and actual deviation value Z measured by the inventers. It shows that the correction value Y obtained by the formula (1) is very approximate to the actual deviation value Z, and the error α is very small. Therefore, the deviation of the magnetic head from the center line of the target track can be reduced by using the correction value Y.

The correction value Y thus obtained is applied to the digital to analog converter 43 via the correction value signal line p. The correction value Y may further include the variance of the deviation value $Y_4$, $Y_5$ or $Y_6$ for the compensation of the characteristics of the optical encoder 22. The correction value Y is converted into analog from r, and summed with the deflection voltage d so as to be supplied to the loop compensation network 41 as the position control voltage h. The compensation network 41 supplies the position control signal 21 to the motor driver 20 so that the motor 17 is rotated in the direction toward the center line of the target track X. Accordingly, the position control voltage h approaches to "0", i.e., the heads 18 and 19 are positioned at the point where the deflection value d is equal to negative to the correction value r. In this state, the heads 18 and 19 are positioned on the center line of the target track.

Thus, the positioning control mode is completed, the processor 10 then send a "SEEK COMPLETE" signal to a host unit via the interface 48. Sequentially, the processor 10 carries out a read or write operation, the same as a conventional disk drive. That is, one of the magnetic heads 18 and 19 reads out the recorded data on the target track. The read-out signal is sent to the interface 48 via the head selector and pre-amplifier 45, AGC amplifier 44 and a data recovery circuit 51. Otherwise, a write data is sent to one of the heads 18 and 19 via the interface 48 and the head selector and pre-amplifier 45, and recorded on the target track.

To meet with further temperature and humidity changes, the calibrating operation is repeated. If the seek command comes more than 30 sec after the initial calibrating operation is over, the processor 10 carries out the calibrating operation before the seeking operation to update the previously stored deviation values $Y_1$, $Y_2$ and $Y_3$. The deviation values $Y_4$ to $Y_6$ are not updated since they represent the characteristics of the position signals of the optical encoder 22 which is not changed. The head is then driven to the target track.

Even after the seek command has come, the processor 10 carries out the calibrating operation, but increasingly less frequently. The above-mentioned 30-second updating interval (the interval from one updating to the next updating) is increased by 4 second every time a 17-second period has elapsed. However, it is to be noted that the updating is performed only when the seek command has come. In the absence of the seek command, only the updating interval is lengthened, with the deviation value remaining unchanged until the seek command has come. The longest calibrating interval is set to be 5 minutes, which is reached after the lapse of about 20 minutes in the disk drive and beyond which the calibrating interval is stabilized. Needless to say, the increasingly longer calibrating interval reflects the thermal equilibrium reached for a drive as a whole.

What is claimed is:

1. A head positioning system for a magnetic disk drive comprising:
   a magnetic disk including at least outer, middle and inner servo tracks on which servo information is recorded, said servo tracks being radially separated by data tracks;
   drive means for driving a magnetic head in a radial direction of said magnetic disk;
   coarse positioning means for enabling said drive means to position said magnetic head on said outer, middle and inner servo tracks;
   measuring means for measuring deviations of said magnetic head from center lines of said outer, middle and inner servo tracks in accordance with said servo information read-out by said magnetic head when said magnetic head is positioned on said outer, middle and inner servo tracks by means of said coarse positioning means so as to generate first, second and third deviation values, respectively;
   determining means for determining an offset correction value for a target track included in said data tracks in accordance with said first, second and third deviation values; and
   fine positioning means for positioning said magnetic head at said target track in accordance with said offset correction value,
   wherein said determining means determines said offset correction value according to a quadratic compensation function.

2. The head positioning system as claimed in claim 1, further comprising: means for rotating said magnetic disk and means for generating an index pulse for indicating a leading portion of said servo tracks, said servo tracks having a servo area at said leading portion indicated by said index pulse.

3. The head positioning system as claimed in claim 1, wherein a number of said data tracks provided between said outer and middle servo track and between said middle and inner servo track are the same.

4. The head positioning system as claimed in claim 1, wherein said determining means has a memory for storing said first, second and third deviation values.

5. The head positioning system as claimed in claim 1, wherein said first, second and third deviation values are updated repeatedly.

6. A head positioning system as claimed in claim 5, wherein said head positioning system positions said magnetic head on said target track in response to a seek command, said first, second and third deviation values being updated only when said seek command has been received.

7. The head positioning system as claimed in claim 1 wherein said drive means is provided with an optical encoder for detecting a drive speed and a drive position of said drive means.

8. A head positioning system as claimed in claim 1, wherein said offset correction value is determined by Lagrange's interpolation formula as follows:

$$2(Y_1 - 2Y_2 + Y_3)\frac{X^2}{(X_3 - X_1)^2} + (4Y_2 - 3Y_1 - Y_3)\frac{X}{(X_3 - X_1)^2} + Y_1$$

wherein X, $X_1$, $X_2$ and $X_3$ denote radial positions of said target track, said outer servo track, said middle servo track and said inner servo track, respectively, and $Y_1$, $Y_2$ and $Y_3$ denote said first, second and third deviation values, respectively.

9. A head positioning system as claimed in claim 1, wherein said first, second and third deviation values are updated in predetermined time intervals.

10. A head positioning system as claimed in claim 9, wherein said time intervals are increased.

11. A head positioning system as claimed in claim 9, wherein said head positioning system positions said magnetic head on said target track in response to a seek command, said first, second and third deviation values being updated only when said seek command has been received.

12. A head positioning system for a magnetic disk drive comprising:
   a magnetic disk including at least outer, middle and inner servo tracks on which servo information is recorded, said servo tracks being radially separated by data tracks;
   drive means for driving a magnetic head in a radial direction of said magnetic disk;
   coarse positioning means for enabling said drive means to position said magnetic head on said outer, middle and inner servo tracks;
   measuring means for measuring deviations of said magnetic head from center lines of said outer, middle and inner servo tracks in accordance with said servo information read-out by said magnetic head when said magnetic head is positioned on said outer, middle and inner servo tracks by means of said coarse positioning means so as to generate first, second and third deviation values, respectively;
   determining means for determining an offset correction value for a target track included in said data tracks in accordance with said first, second and third deviation values; and
   fine positioning means for positioning said magnetic head at said target track in accordance with said offset correction value,
   wherein said coarse positioning means comprises:
   an electronic tachometer for detecting rotational speed of said drive means and generating a motor velocity signal;
   a track boundary detector for generating cylinder pulses based on detected track boundaries;
   a digital to analog converter for converting a target track signal generated by said determining means into an analog target velocity;
   a first subtractor for calculating the difference between said analog target velocity and said motor velocity signal;
   a velocity error amplifier for amplifying said difference from said first subtractor;
   a switch means for outputting said amplified difference to said drive means;
   a cylinder counter for counting the number of said cylinder pulses;
   a register for storing said target track signal generated by said determining means; and
   a second subtractor for calculating the difference between an output of said cylinder counter and said register, an output of said second subtractor being supplied to said determining means in order to update said target track signal.

13. A head positioning system as claimed in claim 12, wherein said determining means determines said offset correction value according to a quadratic compensation function.

14. A head positioning system as claimed in claim 12, further comprising:
   means for rotating said magnetic disk and means for generating an index pulse for indicating a leading portion of said servo tracks, said servo tracks having a servo area at said leading portion indicated by said index pulse.

15. A head positioning system as claimed in claim 12, wherein a number of said data tracks provided between said outer and middle servo track and between said middle and inner servo track are the same.

16. A head positioning system as claimed in claim 12, wherein said determining means has a memory for storing said first, second and third deviation values.

17. A head positioning system as claimed in claim 12, wherein said first, second and third deviation values are updated repeatedly.

18. A head positioning system as claimed in claim 12, wherein said drive means is provided with an optical encoder for detecting a drive speed and a drive position of said drive means.

19. A head positioning system as claimed in claim 12, wherein said offset correction value is represented by Lagrange's interpolation formula as follows:

$$2(Y_1 - 2Y_2 + Y_3)\frac{X^2}{(X_3 - X_1)^2} + (4Y_2 - 3Y_1 - Y_3)\frac{X}{(X_3 - X_1)^2} + Y_1$$

wherein $X$, $X_1$, $X_2$ and $X_3$ denote radial positions of said target track, said outer servo track, said middle servo track and said inner servo track, respectively, and $Y_1$, $Y_2$ and $Y_3$ denote said first, second and third deviation values, respectively.

20. A head positioning system as claimed in claim 12, wherein said first, second and third deviation values are updated in predetermined time intervals.

21. A head positioning system as claimed in claim 20, wherein said time intervals are increased.

22. A head positioning system as claimed in claim 20, wherein said head positioning system positions said magnetic head on said target track in response to a seek command, said first, second and third deviation values being updated only when said seek command has been received.

23. A head positioning system for a magnetic disk drive comprising:
   a magnetic disk including at least outer, middle and inner servo tracks on which servo information is recorded, said servo tracks being radially separated by data tracks;
   drive means for driving a magnetic head in a radial direction of said magnetic disk;
   coarse positioning means for enabling said drive means to position said magnetic head on said outer, middle and inner servo tracks;
   measuring means for measuring deviations of said magnetic head from center lines of said outer, middle and inner servo tracks in accordance with said servo information read-out by said magnetic head when said magnetic head is positioned on said outer, middle and inner servo tracks by means of said coarse positioning means so as to generate first, second and third deviation values, respectively;
   determining means for determining an offset correction value for a target track included in said data tracks in accordance with said first, second and third deviation values; and
   fine positioning means for positioning said magnetic head at said target track in accordance with said offset correction value, wherein said fine positioning means comprises:
a position signal selector for selecting a position signal from said drive means based upon a lower two bit signal of a target track signal generated by said determining means, said position signal selector generating a deflection voltage resulting from the selected position signal;
a digital to analog converter for generating an analog offset correction value in response to said offset correction value from said determining means;
a summing means for summing said deflection voltage and said analog offset correction value and generating an output;
a loop compensation network for providing a control signal in response to the output of said summing means; and
a switch means for outputting said control signal to said drive means in response to a selection signal from said determining means.

24. A head positioning system as claimed in claim 23, wherein said determining means determines said offset correction value according to a quadratic compensation function.

25. A head positioning system as claimed in claim 23, further comprising:
means for rotating said magnetic disk and means for generating an index pulse for indicating a leading portion of said servo tracks, said servo tracks having a servo area at said leading portion indicated by said index pulse.

26. A head positioning system as claimed in claim 23, wherein a number of said data tracks provided between said outer and middle servo track and between said middle and inner servo track are the same.

27. A head positioning system as claimed in claim 23, wherein said determining means has a memory for storing said first, second and third deviation values.

28. A head positioning system as claimed in claim 23, wherein said first, second and third deviation values are updated repeatedly.

29. A head positioning system as claimed in claim 23, wherein said drive means is provided with an optical encoder for detecting a drive speed and a drive position of said drive means.

30. A head positioning system as claimed in claim 23, wherein said offset correction value is determined by Lagrange's interpolation formula as follows:

$$2(Y_1 - 2Y_2 + Y_3)\frac{X^2}{(X_3 - X_1)^2} +$$

$$(4Y_2 - 3Y_1 - Y_3)\frac{X}{(X_3 - X_1)^2} + Y_1$$

wherein X, $X_1$, $X_2$ and $X_3$ denote radial positions of said target track, said outer servo track, said middle servo track and said inner servo track, respectively, and $Y_1$, $Y_2$ and $Y_3$ denote said first, second and third deviation values, respectively.

31. A head positioning system as claimed in claim 23, wherein said first, second and third deviation values are updated in predetermined time intervals.

32. A head positioning system as claimed in claim 31, wherein said time intervals are increased.

33. A head positioning system as claimed in claim 31, wherein said head positioning system positions said magnetic head on said target track in response to a seek command, said first, second and third deviation values being updated only when said seek command has been received.

34. A head positioning method for a magnetic disk drive comprising the steps of:
preparing a magnetic disk including at least outer, middle and inner servo tracks on which servo information is recorded, said servo tracks being radially separated by data tracks;
driving a magnetic head in a radial direction of said magnetic disk in response to a positioning signal so as to position said magnetic head on said outer, middle and inner servo tracks;
measuring deviations of said magnetic head from center lines of said outer, middle and inner servo tracks in accordance with said servo information read out by said magnetic head so as to generate first, second and third deviation values, respectively;
determining an offset correction value for a target track included in said data tracks in accordance with said first, second and third deviation values and a quadratic compensation function; and
positioning said magnetic head at said target track by use of said coarse positioning signal and said offset correction value.

35. A head positioning method as claimed in claim 34, further comprising the step of measuring said first, second and third deviation values again after a predetermined time period has elapsed.

36. A head positioning method as claimed in claim 34, further comprising the step of storing said first, second and third deviation values after measuring said deviations.

37. A head positioning method as claimed in claim 34, further comprising the step of calculating said offset correction value by using the following formula:

$$2(Y_1 - 2Y_2 + Y_3)\frac{X^2}{(X_3 - X_1)^2} +$$

$$(4Y_2 - 3Y_1 - Y_3)\frac{X}{(X_3 - X_1)^2} + Y_1$$

wherein X, $X_1$, $X_2$ and $X_3$ denote radial positions of said target track, said outer servo track, said middle servo track and said inner servo track, respectively, and $Y_1$, $Y_2$ and $Y_3$ denote said first, second and third deviation values, respectively.

* * * * *

UNITED STATES PATENT AND TRADEMARK OFFICE
CERTIFICATE OF CORRECTION

PATENT NO. : 4,878,135
DATED : October 31, 1989
INVENTOR(S) : Toshihiko Makino et al It is certified that error appears in the above-identified patent and that said Letters Patent is hereby corrected as shown below:

Column 12, line 21, after "a", insert --coarse--.

Signed and Sealed this

Twenty-sixth Day of March, 1991

*Attest:*

HARRY F. MANBECK, JR.

*Attesting Officer*      *Commissioner of Patents and Trademarks*